United States Patent [19]

Dawson et al.

[11] 4,302,399

[45] Nov. 24, 1981

[54] ACETYLATION OF CRUDE REACTION PRODUCTS CONTAINING POLYMERIC COLORANTS

[75] Inventors: Daniel J. Dawson, Menlo Park; Robert E. Wingard; Guy A. Crosby, both of Palo Alto, all of Calif.

[73] Assignee: Dynapol, Palo Alto, Calif.

[21] Appl. No.: 128,718

[22] Filed: Mar. 10, 1980

Related U.S. Application Data

[63] Continuation of Ser. No. 947,163, Sep. 28, 1978, abandoned, which is a continuation of Ser. No. 743,203, Nov. 19, 1976, abandoned.

[51] Int. Cl.$^3$ .................... C09B 1/40; C09B 5/42; C09B 43/12; C09B 51/00
[52] U.S. Cl. .................... 260/377; 260/144; 260/208; 260/378; 260/691; 546/75; 546/76; 546/100; 546/154; 564/144
[58] Field of Search ............... 260/144, 208, 377, 378, 260/562 P, 704, 691; 546/75, 76, 100, 154; 564/144

[56] References Cited

U.S. PATENT DOCUMENTS 1,948,224  2/1934  Misslin et al. .................. 260/187
3,114,754  12/1963  Lodge et al. .................. 260/372

OTHER PUBLICATIONS

Houben–Weyl, "Methoden der Organischen Chemie–Stickstoff Verbindungen II und III", vol. XI/2, pp. 30 to 33 (1958).

Southwick et al., J. Amer. Chem. Soc., vol. 78, pp. 1608 to 1611 (1956).

*Primary Examiner*—Floyd D. Higel
*Attorney, Agent, or Firm*—Burns, Doane, Swecker & Mathis

[57] ABSTRACT

Acetylation of residual primary and secondary alkyl amine groups in polymeric colorants, when said colorants are in the form of a crude preparation reaction mixture, is disclosed. The acetylation improves the colorants' water solubility.

8 Claims, No Drawings

ACETYLATION OF CRUDE REACTION PRODUCTS CONTAINING POLYMERIC COLORANTS

REFERENCE TO RELATED APPLICATION

This is a continuation of our prior copending application Ser. No. 947,163, filed Sept. 28, 1978, and now abandoned, which in turn was a continuation of our earlier copending application Ser. No. 743,203, filed Nov. 19, 1976, and now abandoned.

This application is related to U.S. patent application Ser. No. 743,205, filed Nov. 19, 1976 by Robert E. Wingard and Daniel J. Dawson and entitled "Acetylation of Polymeric Colorants," now U.S. Pat. No. 4,169,203, issued Sept. 25, 1979.

BACKGROUND OF THE INVENTION

1. Field of the Invention

This invention relates to an improvement in polymeric colorants. More particularly, it involves polymeric colorants with improved solubility at acidic pH's and an improved method for their achievement.

2. The Prior Art

U.S. Pat. No. 3,920,855 of Dawson, et al., issued Nov. 18, 1975, and U.S. Pat. No. 4,018,826 of Gless, et al. issued Apr. 17, 1977, disclose that polymeric colorants can offer attractive properties such as inability to be absorbed through the walls of the gastrointestinal tract. This nonabsorption means much reduced and possibly eliminated risks of systemic toxicity and suggests advantageous application of stable polymeric colorants in edibles such as foods, beverages and the like. It is a common characteristic of such applications to have aqueous substrates, or to at least contain an aqueous phase, in which the colorant is to be dissolved. These applications also often present acidic environments of use as the majority of food and beverage applications are acidic. Thus, an important property of a polymeric colorant is often its ability to dissolve or remain in solution in an acidic aqueous environment.

One way to achieve this desired acid solubility is to incorporate in the polymeric colorant anionic groups such as carboxyl groups, sulfonate groups or phosphonate groups.

Now, a polymeric colorant of the type disclosed by Dawson, et al., and Gless, et al., is of two parts—a non-chromophoric often alkyl backbone and a plurality of optical chromophores covalently affixed thereto. These anionic groups can be present either attached to the backbone or as part of the chromophores. In either positive they serve to impart water solubility to the final polymeric colorant product.

In the Dawson, et al., and the Gless, et al., disclosures, the chromophore units are covalently bound to the backbone through sulfonamide or amine linkages. In situations where there is very complete substitution of these amine groups by sulfonate groups or by sulfonate-containing chromophores, the character of the overall polymeric colorant is anionic and solubility in acidic aqueous enviroments is fully adequate. In situations where there is a substantial proportion of unsubstituted primary alkyl amines or dialkyl amines present in the polymeric colorant, as can occur either with low degrees of amine substitution by aromatic chromophore units or with substitution by chromophores through an alkyl link, it is seen that the polymeric colorants often haze and precipitate from solution at acidic pH's. In light of the success of the present invention it now appears that at basic to neutral pH's such colorants have a distinctly anionic character imparted by their $COO^-$, $SO_3^-$ or $PO_3^=$ groups and are soluble. It now appears that at acidic pH's the amines begin to become protonated and the polymer approaches an isoelectric state. In view of the present teachings one may explain this precipitation as that at their isoelectric point the polymeric colorants form insoluble intramolecular and cross-linked salts. This isoelectric condition generally occurs at pH's of 2–4 for amine-containing polymeric colorants. This is an unfortunate pH to have precipitation occur as it is the pH of many soft drinks and most fruit-flavored foods—major applications for food colors.

U.S. Pat. No. 4,169,203 of Wingard and Dawson, which matured from application Ser. No. 743,205, filed concurrently with our parent Ser. No. 743,203 discloses that this troublesome hazing and precipitation can be eliminated by acetylating a substantial proportion of the residual amine groups of such polymeric colorants thereby converting the amines to amides.

Acetylation has been applied to crude mixtures outside the area of colorants, for example, in biological systems. In these prior art uses, to our knowledge, large excesses of acetic anhydride, such as 20–50-fold excesses, have been necessary to achieve full acetylation.

STATEMENT OF THE INVENTION

An improvement in the process of acetylating residual primary and secondary alkyl amines in anion-solubilized polymeric colorants has now been found. We have found that the polymeric colorants can be efficiently acetylated when they are in the form of the unpurified crude reaction mixture in which they were formed. That crude liquid mixture comprises 0.1 to 10% by weight of polymeric colorant (as defined more fully hereinbelow), 60–98% by weight aqueous solvent and 0.2–30% by weight unattached organic chromophore and by-products of the polymeric colorant preparation. The crude mixture is contacted with acetic anhydride at from about 0° C. to about 20° C. and a basic pH for from about 1 to about 60 minutes. The amount of anhydride needed is unexpectedly low, from 1 to 6 equivalents of anhydride per equivalent of acetylatable amine being sufficient. We cannot explain why such a small amount of anhydride is effective. The crude reaction mixtures are dilute and basic (pH 7–13) aqueous solutions. These conditions should result in substantial rapid hydrolysis of the added anhydride. Possibly, although this has not been proven, there is an unexpected interaction between the colorant as a result of hydrophobic regions in its polymer structure which causes it to preferentially associate and react with the anhydride

DETAILED DESCRIPTION OF THE INVENTION

The present invention involves an improved process for acetylating certain types of amine groups present in a polymeric colorant. These amines, referred to as "acetylatable amines," are primary alkyl amines

wherein is an alkyl carbon, and secondary alkyl amines,

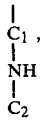

wherein $C_1$ and $C_2$ are each alkyl carbons. Amines which are not affected by the present acetylation are tertiary amines, of course, and primary or secondary aromatic amines, which may be shown as

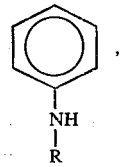

wherein R is hydrogen or an alkyl.

The amines acetylated by the present invention may be present as residual amines pendant from the colorants' nonchromophoric backbone or they may be present in an alkyl group linking the chromophore to the backbone. An example shows shows both of these two configurations is as follows:

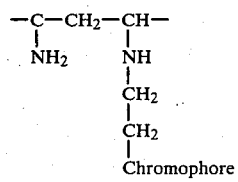

The colorants treated by the present improved process are polymeric colorants. They are composed of nonchromophoric organic backbone, preferably an alkyl or an alkyl ether backbone, from which depends a plurality of units of a covalently attached chromaphoric group (that is, a group which presents a visual color to the human eye) and a plurality of acetylatable primary or secondary alkyl amines. The colorants also contain covalently attached "anionic solubilizer groups." These are carboxyl, phosphonate or, preferably sulfonate, groups. These groups may be attached to the chromophore, but in most cases depend from the backbone. Typical colorants can be based upon backbones which are olymers of the vinyl amines or copolymers of the vinylamines with monomers which contain or lead to the anionic solublizer grops. Examples of such colorants include colorants having backbones of poly(vinylamine), poly(N-lower alkyl (1–4 carbon)vinylamine), poly($\alpha$ or $\beta$ lower alkylvinylamine; any of the foregoing with a portion of its amine groups in a sulfamated from; copoly(vinylamine/vinylsulfonate); copoly(vinylamine/acrylic or methacrylic acid); copoly(vinylamine/vinylphosphonate) and any of the foregoing copolymers employing in place of vinylamine other members of the group of vinylamines.

Structurally, these materials may be illustrated, for example, as

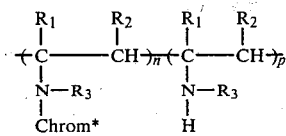

wherein $R_1$, $R_2$, and $R_3$ are each H or a lower (1–4 carbon) allyl (preferably H) and n+p are numbers totaling 100–10,000.

* Chrom* - a chromophore containing an anionic solubilizer.

These are only three representative materials. They are not to be construed as limiting the present invention—other types of polymeric colorants can be used as well.

The chromophores, denominates Chrom or Chrom* in the above formulae, which are incorporated in the polymeric colorants acetylated in accord with this invention, may be selected from the class of organic groups which present an optical color to the human eye when covalently bound into polymeric form. The precise chromophore used is not considered to be critical to the functioning of the present invention. Chromophores may be selected, for example, from the classes of azo, anthraquinone, triphenylmethane, indigoid, xanthene, and nitroaniline colors and the like. The majority of our development efforts and the following examples have been devoted to azo and anthraquinone colors because of the wide range of intense clear colors they present. This does not imply that the present invention would not be useful with other classes of colors.

Preferred anthraquinone chromophores in their unattached state have a leaving group such as a —Cl, —Br, —I, —$SO_3'^{Na+}$, —$N_2Cl^-$, or —$NO_2$ group attached to their aromatic ring. This permits the chromophore's facile attachment to the backbone via for example an amine group by known techniques such as the Ullmann reaction wherein copper or a copper salt is used to catalyze the leaving group's displacement by amines. In many cases, no catalyst is required to effect the desired displacement. Representative classes of useful anthraquinone chromophores include:

Aminoanthraquinone chromophores of the structure of Formula I:

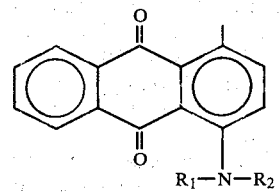

formed by coupling the monomer IA wherein $R_1$ is a hydrogen or a lower saturated alkyl of up to four carbon atoms,

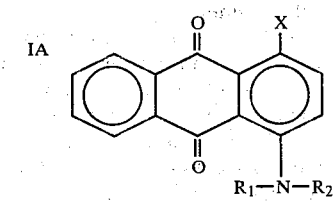

$R_2$ is hydrogen, a lower saturated alkyl of up to four carbon atoms or an aryl or aklaryl of from six to eight carbons and X is a leaving group. These are useful to give the range of blue colorants listed in Table I.

TABLE I

| COMPOUND | | |
|---|---|---|
| $R_1$ | $R_2$ | COLOR |
| hydrogen | hydrogen | purplish blue |
| hydrogen | methyl | greenish blue |
| hydrogen | ethyl, propyl or butyl | greenish blue |
| hydrogen | aryl | navy blue |

Anthrapyridones of the structure of Formula II:

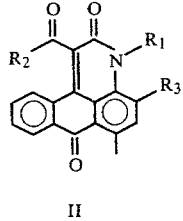

II   IIA formed by coupling the corresponding monomer, wherein X is a leaving group, $R_1$ is hydrogen, a lower saturated alkyl of from 1 to 4 carbon atoms, inclusive, or an aryl grouping of about 6 carbons, $R_2$ is a 1 to 4 carbon lower saturated alkyl, a 1 to 4 carbon lower saturated alkoxy, or an aryl grouping of about 6 carbon atoms, and $R_3$ is hydrogen or a 1 to 4 carbon lower saturated alkyl. These chromophores are rich reds. Preferred among the anthrapyridones are these according to Formula II wherein $R_1$, $R_2$ and $R_3$ are shown by Table II.

TABLE II

| $R_1$ | $R_2$ | $R_3$ |
|---|---|---|
| hydrogen | 1–4 carbon alkyl | 1–4 carbon alkyl |
| hydrogen | methyl | methyl |
| hydrogen | methoxy | 1–4 carbon alkyl |
| hydrogen | methoxy | methyl |
| hydrogen | ethoxy | 1–4 carbon alkyl |
| hydrogen | ethoxy | methyl |
| hydrogen | phenyl | methyl |
| methyl | methyl | hydrogen |
| methyl | phenyl | hydrogen |
| ethyl | methyl | hydrogen |
| methyl | methoxy | hydrogen |
| ethyl | methoxy | hydrogen |

Anthrapyridines of the structure of Formula III:

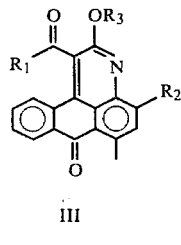

III   IIIA wherein X is a leaving group, $R_1$ is a 1 to 4 carbon lower alkyl group or an aryl group of about 6 carbons and $R_2$ is hydrogen or a 1 to 4 carbon lower alkyl and $R_3$ is a 1 to 4 carbon alkyl group or aryl group of about 6 carbons. These colorants range in hue from yellow to red. Preferably, $R_2$ is hydrogen or methyl. Other typical anthraquinone chromophores include the pyridinoanthrones, anthrapyrimidines and anthrapyrimidones.

Other chromophores include azo chromophores, such as those having monomeric forms containing sulfonyl halide groups since they can join to the amino backbone via the well known Schotten-Baummann reaction. Exemplary azo chromophores and representative halo precursors include:

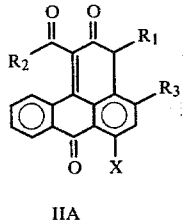

The Schotten-Baumann reaction also functions with sulfonyl halide-containing nonazo chromophores such as:

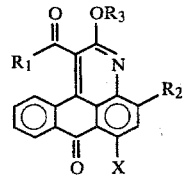

| Chromophore | Precursor |
|---|---|
| 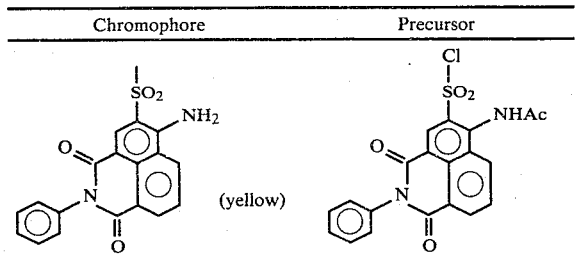 (yellow) | |

Acetylation gives its most noticeable improvements to polymeric colorants having anthraquinone chromophores and these are preferred.

As has been noted, these types of colorants are formed by coupling chromophores to preformed backbones, such as with an Ullmann reaction or a Schotten-Baumann reaction. In some cases the formed colorants are sulfonated following formation. In either case the production yields a crude preparation reaction mixture. This mixture has the following general composition and properties. It is a dilute aqueous solution of polymeric colorant containing residual unreacted chromophore, chromophore and polymer degradation products, and byproducts. It also contains salts of neutralization and is usually basic. It may contain a coupling catalyst. These solutions are further characterized as containing:

Polymeric colorant: 0.1 to 10% w (basis solution) typically 0.5 to 7% w

* Organic impurities—including unreacted chromophore and organic degradation products and byproducts from the chromophore and/or polymer backbone: 0.1 to 15% w more typically 0.5 to 10% w

* Inorganic salts of neutralization such as NaCl, NaBr and the like: 0.1 to 15% w more typically 0.5 to 10% w Catalyst: 0 to 0.5% w Solvent—water plus up to about 20% water-miscible organic liquids especially 1–4 carbon lower alkanols, and glycols and glycol ethers and organic bases such as pyridine: 60–98+%, more typically 75–97%

*The amount of impurities and inorganic salts ranges from 50 to 300% of the amount of polymeric colorant.

Such crude reaction mixtures are acetylated directly, without substantial purification. By this is meant that the polymeric colorant is not isolated and purified and redissolved in a fresh liquid medium. It will be appreciated that minor treatment of this crude reaction mixture, such as filtering, partially neutralizing, skimming, heating, cooling, adding of additional solvents or diluents, or the like could be performed on the reaction mixture and still have a crude reaction mixture which could be treated in accord with the present invention.

In the acetylation of this invention, a crude reaction solution of the colorant is contacted with acetic anhydride in liquid phase. This reaction is carried out at low temperatures such as from about 0° C. to about 20° C. Lower temperatures could be used, but, in view of the aqueous solvent of the solution of colorant, it is often convenient not to go markedly below 0° C. Preferred temperatures are 0° C. to 10° C. The amount of acetic anhydride employed is controlled to from 1 to 6 and preferably 1.5 to about 4 equivalents of anhydride based on the moles of acetylatable amine. Larger amounts are not needed.

The pH of the solution should be kept in the basic range such as from about pH 7–13, preferably 9–13, more preferably 10–12.5 during the contacting. This often involves gradually adding base such as an alkali metal hydroxide, for example NaOH or KOH, to the acetylation mixture during contacting. The length of contacting time need not be long. Times of from a minute or two to one hour are generally employed. Longer times could be used but are not seen to offer any advantage.

Following acetylation, it is usual to isolate and recover the polymeric colorant from the crude reaction mixture. This can be carried out by precipitating the colorant or by removing low molecular weight impurities from the solution such as by ultrafiltration, ion exchange and the like, and thereafter drying the purified solution to recover the colorant.

The present invention will be demonstrated by the following examples. These are given to illustrate the invention and are not to be construed as limiting its scope.

EXAMPLE I

A. Preparation of Copolymer Backbone

To 2304 g of acetamide (technical) in a 12 liter reaction flask is added 62.2 ml of 6 M aqueous sulfuric acid followed immediately by 661 g of acetaldehyde (99+%). This mixture is stirred and heated until the internal temperature reachs 78° C. (11 minutes) at which point the clear solution spontaneously crystallizes, causing a temperature rise to 95° C. The reaction product, ethylidene-bis-acetamide, is not separated. Heating and stirring are continued for another 5 minutes to a temperature of 107° C. and a mixture of 150 g calcium carbonate (precipitated chalk) and 150 g of Celite ® diatomaceous earth powder is added. A first distillate fraction of water and acetamide is removed. The remaining materials are cracked at 35 mm Hg and 185° C. A fraction made up of vinylactamide and acetamide is taken overhead, analyzed by NMR and found to contain 720 g of vinylacetamide and acetamide. A portion of this pooled material is dissolved in isopropanol, cooled, and filtered to yield a stock solution. This stock solution is analyzed and found to be 4.1 molar in vinylacetamide.

Into a five liter flask is added 505 ml of a vinylacetamide solution obtained by stripping isopropanol from 900 ml of the aboe stock solution (containing 3.69 moles of vinylacetamide). AIBN (15 g) in 1500 ml of water is added followed by 1279 g of 25% W sodium vinyl sulfonate in water (Research Organic Corporation) and a liter of water. This is 2 equivalents of sulfonate per 3 equivalents of vinylacetamide. Following deoxygenation, the mixture is heated to 65° C. and there maintained with stirring for twenty hours. This reaction mixture is then reduced to ⅔ volume, solid AIBN is removed and the liquid added to 8 gallons of isopropanol. The copolymer precipitate is collected and dried in vacuum to yield 865 g of solid copolymer (MW $6.6 \times 10^4$). Whenever an experimental molecular weight is given in this specification, it is derived by gel permeation techniques. Detection is by refractometer with standardization being based on suitable purchased poly(styrene) or poly(styrene sulfonate) standards.

Into a two liter flask is added 863 g of the just-noted solid product, 2.5 liters of water and a liter of concentrated hydrochloric acid. The mixture is refluxed (99°–110° C.) for about 24 hours and cooled, the solid precipitate is washed, and dissolved in 3 liters of 10% NaOH. This mixture is added to about 12 liters of methanol to give 400 g of fine solid precipitate.

B. Preparation of Chromophore

Into a 5 liter kettle is charged 750 g of 1-amino-2-methyl-4-bromo-anthraquinone (Sandoz AMBAX), 1550 g of ethyl acetoacetate, 580 g of nitrobenzene, and 196 g of sodium acetate. The mixture is deoxygenated and heated to 150° for about four hours. During the last 2½ hours, 385 ml of distillate is collected. The product is cooled, collected on a filter and washed with acetone and water and dried to yield 830 g of the chromophore.

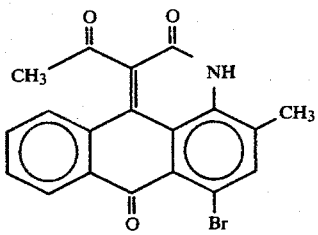

C. Attachment of Chromophore

Three hundred grams of the copolymer of Part A is dissolved in 4.2 liters of 1 normal NaOH and the mixture is heated to 90° C. Then, 480 g of the chromophore of Part B and 20 g of $Cu_2Cl_2$ catalyst are added. The mixture is heated at 90°–101° C. for 3½ hours, while an additional 4 liters of NaOH and an additional 20 g of catalyst are added. Finally, the mixture is cooled by adding 10.7 kg of ice.

D. Acetylation

With stirring, 20° Bé. hydrochloric acid is added to the mixture of Part C over 5–10 minutes until the pH of the mixture reaches 11.0. Then, at 0° C., 285 ml of acetic anhydride is added over a ten minute period with vigorous stirring. During the first ½ to ⅔ of this addition the pH is held at 11.0±0.5 with 50% NaOH addition. During the final third, the pH is held at 12.0±0.5. Acetylation occurs. Then, the solution is brought to pH 10 by HCl addition. It is ultrafiltered and treated with an ion exchange column to remove impurities and catalyst and yield a colorant product.

The other conditions of the acetylation are summarized as follows:
moles anhydride/moles acetylatable amine: 2.24
composition of crude reaction mixture
  polymeric colorant concentration: 2–3%
  impurities and byproducts: 2–3%
  percent of amines acetylated: 90+%

EXAMPLE II

The acetylation of Example I is repeated using 1.75, 4 and 5 equivalents of anhydride per equivalent of acetylatable amine. In each case 85+% of the amines are acetylated.

The acetylated products are compared with the equivalent unacetylated product. Both materials dissolve in water at pH 7. As acid is slowly added, the unacetylated material shows a tendency to haze and precipitate from solution. The acetylated matrial does not precipitate or haze at pH's as low as 2–3.

EXAMPLE III

The acetylation of Example I is repeated with the following changes. In the preparation of the crude reaction product, a different chromophore,

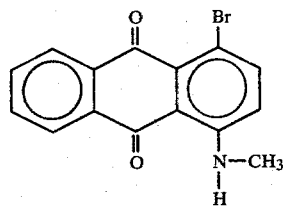

is attached. The crude reaction mixture contains levels of colorant and impurities similar to that shown in Example I. The acetylation is carried out at 5° C. using a pH of 11 and three equivalents of anhydride per mole of acetylatable amine. The acetylation times are varied between 3 and 60 minutes. Acetylation of 80+% of the acetylatable amines occurs yielding a product which is more soluble in acidic water than its unacetylated counterpart.

What is claimed is:
1. The process which comprises:
(a) contacting a liquid mixture comprising 0.1 to 10% by weight of polymeric colorant containing anionic water-solubilizing groups selected from the group consisting of sulfonate groups, carboxylate groups, sulfamate groups and phosphonate groups; and comprising a nonchromophoric organic polymer backbone to which is covalently bonded a plurality of units of organic chromophore and a plurality of residual primary or secondary alkyl nitrogens, 60–98% by weight aqueous solvent, 0.2–30% by weight unattached organic chromophore and byproducts of the polymeric colorant preparation, with from 1 to 6 equivalents of acetic anhydride per mole of primary and secondary alkyl amines on said polymeric colorant, said contacting being effected at a pH of 9–13, a temperature of from 0° to 10° C. and for a time of from 1 to 60 minutes, thereby acetylating said primary and secondary alkyl amines to amides and forming an acetylated polymeric colorant in which the number of said primary or secondary alkyl nitrogens present in acetylated form as amides is at least twice the number of said primary or secondary alkyl nitrogens present as unacetylated amines and the number of anionic water-solubilizing groups is at least three times the number of said residual primary or secondary alkyl nitrogens present as unacetylated amines, and
(b) recovering said acetylated polymeric colorant.
2. The process of claim 1 wherein the amount of acetic anhydride is from 1.5 to 4 equivalents per mole of primary and secondary alkyl amines.
3. The process of claim 2 wherein said water-solubilizing groups are sulfonate groups.
4. The process of claim 2 wherein said liquid mixture is additionally defined as being a mixture which results from the copper-catalyzed coupling of a bromoanthraquinone chromophore to amine groups pendant from a polymeric backbone.

5. The process of claim 4 wherein the bromoanthraquinone has the formula

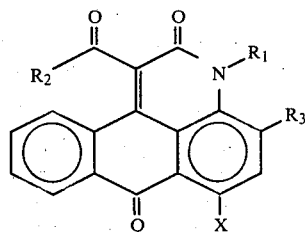

wherein $R_1$ is selected from among hydrogen and 1 to 4 carbon saturated alkyls, $R_2$ is selected from 1 to 4 carbon alkyls and saturated alkoxies, $R_3$ is hydrogen or a 1 to 4 carbon alkyl and X is a halo.

6. The process of claim 5 wherein the amount of acetic anhydride is from 1.5 to 4 equivalents per mole of acetylatable primary amine.

7. The process of claim 6 wherein $R_1$ is hydrogen, $R_2$ is ethoxy or methyl, and $R_3$ is hydrogen or methyl.

8. The process of claim 7 wherein $R_3$ is methyl.

* * * * *